United States Patent Office 3,461,378
Patented Aug. 12, 1969

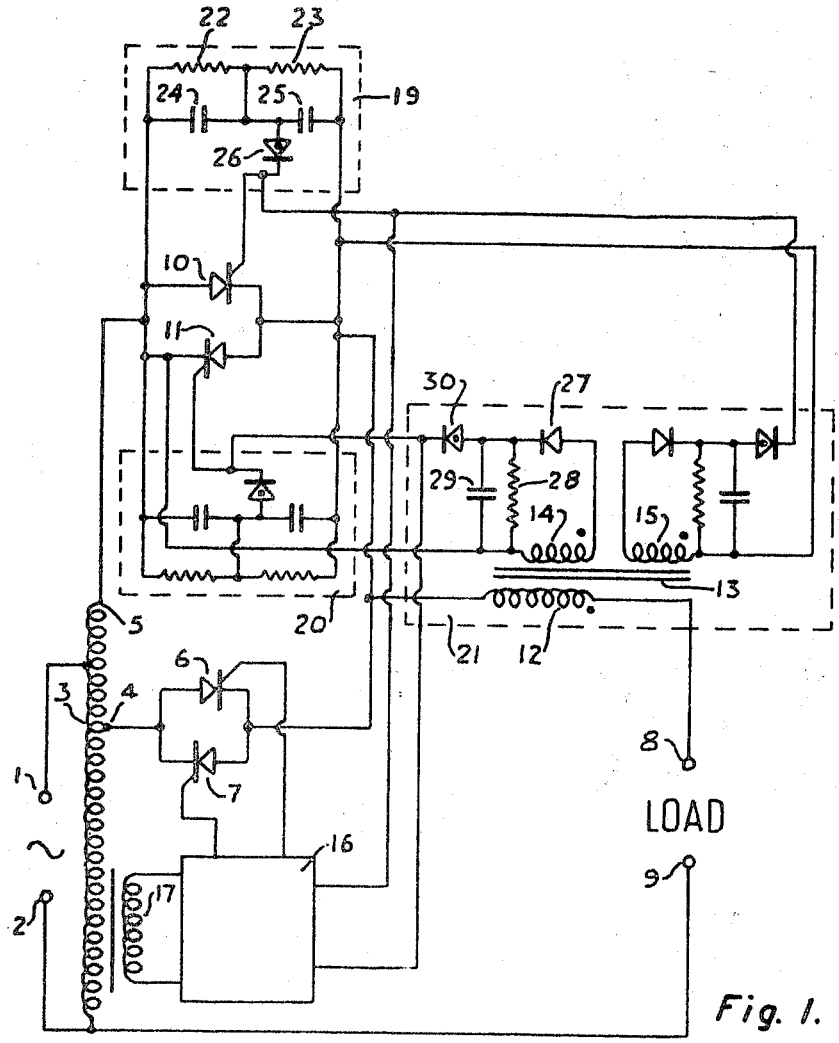
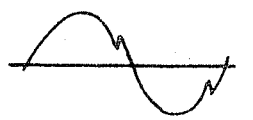
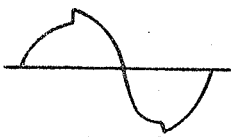
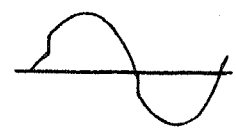
Fig. 2a.     Fig. 2b.     Fig. 2c

3,461,378
VOLTAGE REGULATING CIRCUITS WITH OVER-VOLTAGE AND/OR OVER-CURRENT PROTECTION
Kenneth G. King, London, England, assignor to Westinghouse Brake and Signal Company, Limited, London England
Filed Jan. 20, 1967, Ser. No. 610,600
Claims priority, application Great Britain, Feb. 18, 1966, 7,238/66
Int. Cl. H02p 13/06
U.S. Cl. 323—43.5
10 Claims

ABSTRACT OF THE DISCLOSURE

A protective control circuit is added to the known form of "Syntap" tap changing voltage regulator, whereby conduction is rapidly transferred to the higher potential tap of the supply transformer in the event of an over-voltage or over-current, so that the higher potential thyristors are automatically protected against the voltage transients while the lower potential thyristors are relieved of overload currents.

---

This invention relates to voltage regulating circuits.

According to the present invention there is provided an A.C. voltage regulating circuit including a transformer winding, two spaced tappings on which are connected via respective switching means to a terminal via which a load may be supplied, means being provided for in operation determining the instants in half cycles, of an A.C. supply to the circuit at which the switching means connected to the tapping corresponding to the higher output voltage is rendered conducting to supplement an output voltage waveform supplied prior to such an instant in the respective half cycles via the other switching means and detecting means for detecting a condition in which one of the switching means is subjected to a predetermined over voltage or to a predetermined over current and for, on detection of such a condition, ensuring conduction of the switching means connected to the tapping corresponding to the higher voltage output.

It may be preferable but not essential that detecting means are provided to detect both the over voltage and the over current to render an appropriate switching means conducting on detection of either condition.

With such a detecting means to detect the over voltage, it may be arranged that the switching means connected to the tapping corresponding to the higher output voltage does not require to be rated for maximum transient voltages which may occur in the circuit but rather only need it be rated for the current peak A.C. voltage.

Again, with the detecting means to detect the over current, it may be arranged that the other switching means requires not to be rated for over load current but only for normal maximum currents.

With the detecting means for detecting both over current and over voltage, both the aforementioned benefits may be achieved.

In order that the invention may be clearly understood and readily carried into effect, the same will be further described by way of example with reference to the accompanying drawing in which:

FIG. 1 illustrates in diagrammatical form, a voltage regulating circuit according to the invention and FIGS. 2a, 2b and 2c show waveforms illustrative of the operation of the basic voltage regulating circuit.

Referring to FIG. 1, an alternating current supply is connected to terminals 1 and 2, as shown, which are connected across a section of an auto-transformer winding 3. The transformer winding has a tapping 4 below the connection of terminal 1 and a further tapping 5 at the upper end of the winding. The tapping 4 is connected via an inverse parallel connected pair of controllable rectifier devices 6 and 7 to the output terminal 8. Again, the tapping 5 is connected via an inverse parallel connected pair of controllable rectifier devices 10 and 11, as shown, to the output terminal 8. Between these pairs of controllable rectifier devices and the terminal 8 there is connected a primary winding 12 of a current transformer 13 having secondary windings 14 and 15, as shown, to be referred to hereafter.

A triggering circuit represented by the block 16 is provided having outputs connected to the triggering electrodes of the controllable rectifier devices 6, 7, 10 and 11 and an input to the triggering circuit is derived from an auxiliary winding 17 coupled to the auto transformer winding 3. The purpose of this coupling is to synchronise the triggering with the A.C. supply waveform.

In operation of the basic circuit arrangement, it will be assumed that a load is connected to the terminals 8 and 9 and that the controllable rectifier device 6 is triggered at the beginning of each half cycle in which the supply voltage is positive at the upper end of the auto-transformer winding 3. The controllable rectifier device 10 is then triggered at an instant during this half cycle which is variable in accordance with the required output voltage. By thus varying the electrical angle in the half cycle at which 10 is rendered conducting, the mean voltage applied to the load is continuously variable between the upper and lower tapping voltages on the auto-transformer winding 3. The controllable rectifier devices 7 and 11 are controlled similarly during the negative half cycles of the supply. Reference to FIG. 2 illustrates basically the output waveform which may be achieved with the circuit arrangement, and the waveform shown at (a) represents an output voltage towards the lower end of the control range; the waveform at (b) represents a substantially intermediate voltage waveform in the range of control and (c) represents a voltage waveform towards the upper end of the control range. Clearly, the circuit may operate either as an open loop control circuit or the triggering circuit 16 may be provided with feedback from a voltage sensing arrangement across the load terminals 8 and 9 to provide closed loop voltage stabilisation.

With the circuit arrangement discussed so far, the controllable rectifier devices require to be rated to withstand the most severe over voltage and over current conditions which may be encountered in operation of the circuit and since these conditions may arise with any pattern of conduction from the upper and lower tapping points on the auto-transformer, that is with controllable rectifier devices 10 and 11 conducting continuously or with controllable rectifier devices 6 and 7 conducting continuously in the extreme, or some alternative condition. It may, therefore, be necessary in the absence of protective measures to choose the rating of all the controllable rectifier devices to accommodate the maximum transient voltage which may occur between the tappings on the transformer winding. In addition, it is generally similarly required that the devices shall also accommodate the maximum overload current which is likely to be encountered.

In accordance with the present example of the invention, connected across the pair of controllable rectifier devices 10 and 11 there are respective over voltage detector circuits included in the dotted rectangles 19 and 20. In addition, the aforementioned current transformer 13 is included in an over current detecting circuit comprised by the components in the rectangle 21.

Taking the case of the over voltage detecting circuit 19, this circuit consists of a potentiometer formed by a pair of resistors 22 and 23 with respective parallel capacitors 24 and 25, the whole being connected across the pair of controllable rectifier devices 10 and 11. In addition, the junction of 24 and 25 is connected via a four layer triggering diode 26 to the trigger electrode of the device 10.

In operation of the over voltage detector 19, when the forward voltage across the controllable rectifier device 10 attains more than a predetermined magnitude this is detected as a voltage at the junction of 24 and 25 which is positive relative to the cathode of the controllable rectifier device 10 and the triggering device 26 breaks over into its conducting condition and triggers the controllable rectifier device 10 into the conducting condition. It will be appreciated that if the controllable rectifier device 10 is already conducting, the voltage detection circuit 19 can have no effect.

The operation of the voltage detection circuit 20 is substantially identical to that of 19 to trigger the device 11 for voltages in excess of a predetermined value in the opposite direction across the pair of controllable rectifier devices 10 and 11 and will not be discussed in greater detail.

Referring now to the over-current sensing device 21, this device has two current sensing portions, one associated with the winding 14 and the other associated with the winding 15 mentioned earlier. The winding 14 has one terminal connected via a diode 27 to the upper terminal of a parallel arrangement of a resistor 28 and a capacitor 29 the lower terminal of which is connected to the second terminal of the winding 14. In addition, the common junction of 27, 28 and 29 is connected via a four layer triggering diode to the triggering electrode of the controllable rectifier device 11, the cathode of which is connected to the other side of the parallel pair of components 28 and 29. In operation, therefore, when the current flowing in 14 gives rise to more than a predetermined voltage across the capacitor 29, the four layer device 30 breaks over into its conducting condition to provide a triggering signal for the controllable rectifier device 11. It will be appreciated that this over-current is initially a current which is flowing via the controllable rectifier device 7 and the device 7 is thereby relieved of further over-current by the triggering of the device 11.

It will be appreciated that for over-current flowing via the device 6, means must be provided for rendering the controllable rectifier device 10 conducting and for this purpose the portion of the current sensing circuit associated with the winding 15 is provided and this operates in a manner substantially identical to that of the portion of the circuit associated with the winding 14 and will, therefore, not be further described.

It will be noted that on reversal of the supply voltage, the four layer triggering diodes and the controllable rectifier devices which they are operable to trigger, become non-conducting by natural commutation and, therefore, no special means for operating these devices otherwise than into the conducting condition is necessary.

By virtue of the over voltage detection circuits 19 and 20, the benefit may be obtained firstly that the controllable rectifier devices 10 and 11 do not require to be rated for the maximum transient voltages which may occur in operation of the circuit but only for the recurrent peak voltage. Secondly, by virtue of the over-current detector 21, the controllable rectifier devices 6 and 7 may not require to be rated to accommodate over-load current but only for the normal load currents to be encountered in operation of the circuit.

Employing both the protective measures in combination as described in reference to FIG. 1, it may, therefore, only be necessary to have one pair of controllable rectifier devices rated for the maximum transient voltage between taps on the transformer winding and the normal load current and one pair of controllable rectifier devices rated for the over-load current and the recurrent peak voltage between the tappings on the transformer winding, instead of it being necessary to provide two pairs of controllable rectifier devices each rated for the maximum voltage and maximum over-load current which may be encountered.

The invention is not limited to the forms of switching means and over-current and over-voltage detection circuits which are illustrated in the above example and any other suitable form of such switching means and detection circuits may be employed as desired.

Again, the invention is also applicable to other arrangements of a regulator of the type described in the foregoing. For example, the input terminals 1 and 2 may be interchanged with the output terminals 8 and 9. In this case, the controllable rectifier devices 6 and 7 become the switching means connected to the tapping of the transformer winding corresponding to the higher output voltage whereas in the present arrangement, as shown in FIG. 1, the controllable rectifier devices 10 and 11 form the switching means associated with the tapping of the transformer, namely, 5, corresponding to the higher output voltage. The functions of the pairs of controllable rectifier devices are, therefore, reversed and the connections of the triggering circuit 16 will, therefore, require to be adjusted correspondingly.

Again, although as described in the foregoing, the invention is applied specifically to a single phase voltage regulating circuit, the invention may equally be applied, if required to polyphase regulating circuits such as are described in the specification of co-pending British patent application No. 6,412/65.

Having thus described my invention what I claim is:

1. An A.C. voltage regulating circuit comprising a transformer winding; first and second spaced tappings on said winding; first and second switching means connecting said transformer tappings to a load terminal; means for supplying an A.C. voltage; means for determining the instants in half cycles of said A.C. voltage at which the switching means connected to the transformer tapping which gives rise to the higher effective turns ratio of the transformer is rendered conducting, the higher output voltage produced by this tapping supplementing the output voltage waveform provided prior to said instant in said half cycles by said other switching means; and detecting means for detecting a condition wherein at least one of said first and second switching means is subjected to an overload and, responsive to the detection of such a condition, for rendering conductive the switching means connected to the transformer tapping which gives rise to the highest effective turns ratio of the transformer.

2. An A.C. voltage regulating circuit as claimed in claim 1, wherein the tapping is located on a winding of the transformer from which the output is derived.

3. An A.C. voltage regulating circuit as claimed in claim 2, wherein the transformer comprises an auto transformer.

4. An A.C. voltage regulating circuit as claimed in claim 1 wherein said first and second switching means comprise semi-conductor controllable rectifier devices arranged in oppositely connected parallel pairs.

5. An A.C. voltage regulating circuit as claimed in claim 1 wherein said overload comprises an over-voltage.

6. An A.C. voltage regulating circuit as claimed in claim 1, wherein said overload comprises an over-current.

7. An A.C. voltage regulating circuit as claimed in claim 1 wherein said detector means includes means for detecting an over-current and means for detecting an over-voltage.

8. An A.C. voltage regulating circuit as claimed in claim 5, wherein said over-voltage detecting means comprises potentiometer means, a breakover device and means for applying at least a portion of the voltage across said potentiometer means to said breakover device, said breakover device, responsive to the magnitude of the voltage applied thereto, being capable of breaking down to provide a switching signal to a said switching means.

9. An A.C. voltage regulating circuit as claimed in claim 6 wherein said over-current means comprises a current transformer including a secondary winding, means for rectifying the current in said transformer secondary winding to produce a control voltage and breakover means responsive to a predetermined value of said control voltage for breaking over to cause switching of a said switching means.

10. An A.C. voltage regulating circuit as claimed in claim 7 where said first switching means comprises a pair of semiconductor controlled rectifiers rated at recurrent peak voltage and said second switching means comprises a pair of semiconductor controlled rectifiers rated for normal load currents.

References Cited

UNITED STATES PATENTS

| | | | |
|---|---|---|---|
| 1,914,193 | 6/1933 | Bedford. | |
| 3,281,652 | 10/1966 | Perrins | 323—19 |
| 3,340,462 | 9/1967 | Ebersohl | 323—43.5 |
| 3,374,420 | 3/1968 | Weber | 321—14X |

JOHN F. COUCH, Primary Examiner

G. GOLDBERG, Assistant Examiner

U.S. Cl. X.R.

317—33; 323—45